United States Patent [19]
Polemenakos et al.

[11] 3,908,009
[45] Sept. 23, 1975

[54] INHIBITING DISCOLORATION OF AQUEOUS COMPOSITIONS CONTAINING HEXAMETHYLENETETRAMINE 1,3-DICHLOROPROPENE SALTS

[75] Inventors: Sotiros C. Polemenakos, Framingham; Horst G. Langer, Wayland, both of Mass.

[73] Assignee: The Dow Chemical Company, Midland, Mich.

[22] Filed: Apr. 29, 1974

[21] Appl. No.: 465,038

[52] U.S. Cl. .............. 424/249; 260/248.5; 252/401
[51] Int. Cl.² ...................... A01N 9/22; A61K 31/53; A61L 13/00
[58] Field of Search ................. 424/249; 260/248.5; 252/401, 405, 407

[56] References Cited
UNITED STATES PATENTS

| | | | |
|---|---|---|---|
| 3,228,829 | 1/1966 | Wolf et al. | 260/248.5 |
| 3,364,118 | 1/1968 | Howard et al. | 424/177 |
| 3,687,611 | 8/1972 | Liddell | 21/2.7 |
| 3,758,464 | 9/1973 | Prindle et al. | 260/248.5 |

OTHER PUBLICATIONS

Dow Chem. Co., Information booklet "Dowicil 100", 1965–1968, and publication Antimicrobial Agents, section II–4, Paint Industry, 1962–1968.
Chemical Abstracts, Vol. 74, 1971, item 31068k and Vol. 67, 1967, item 62910p.
Chemical Abstracts, Vol. 78 (1973), 151565z and Vol. 78 (1973), 57731d.

*Primary Examiner*—Donald B. Moyer
*Attorney, Agent, or Firm*—Theodore Post; C. Kenneth Bjork

[57] ABSTRACT

Aqueous compositions of cis- and cis-, trans-1-(3-chloroally)-3,5,7-triaza-1-azoniaadamantane chloride mixtures, which normally discolor on aging, are stabilized against discoloration by adding thereto an amine of the group of morpholine, ethylamine, N-methylethanolamine, diethanolamine, dipropylamine, diisopropanolamine and di-sec.-butanolamine.

2 Claims, No Drawings

3,908,009

INHIBITING DISCOLORATION OF AQUEOUS COMPOSITIONS CONTAINING HEXAMETHYLENETETRAMINE 1,3-DICHLOROPROPENE SALTS

BACKGROUND OF THE INVENTION

Both cis-1-(3-chloroally)3,5,7-triaza-1-azoniaadamantane chloride, commercially available as DOWICIL 200 and hereinafter referred to as "Cis-Compound," and commercial cis-, trans- mixtures of 1-(3-chloroallyl)-3,5,7-triaza-1-azoniaadamantane chloride, commercially available as DOWICIL 100, containing 55% cis-isomer and 45% trans-isomer, hereinafter referred to as "Cis-,Trans-compounds," are old and successful antimicrobial agents; U.S. Pat. No. 3,228,829. They are particularly effective in aqueous dispersions or emulsions. Cis-Compound is used primarily in cosmetic and allied formulations. Cis-,-Trans-Compound is used in other commercial applications. Both products are prepared by reacting hexamethylenetetramine with 1,3-dichloropropene. In making Cis-,-Trans-Compound, the hexamethylenetetramine is reacted with a commercial mixture containing cis- and trans-1,3-dichloropropene and inert material, while in the case of Cis-Compound, the cis-1,3-dichloropropene is separated from the above mixture and reacted with hexamethylenetetramine to give Cis-Compound.

SUMMARY OF THE INVENTION

Both Cis-Compound and Cis-, Trans-Compound, when utilized in clear or light-colored formulations containing a continuous or discontinuous aqueous phase wherein the antimicrobial is present primarily in the aqueous phase, visibly yellow on aging. This is an undesirable phenomenon, especially for the cosmetic industry.

The present invention prevents such discoloration by adding to aqueous formulations containing Cis-Compound or Cis-, Trans-Compound an amine of the group, morpholine, ethylamine, N-methylethanolamine, diethanolamine, dipropylamine, diisopropanolamine or di-sec.-butanolamine. Advantageously, the range of color inhibition is between 1 to 5 weight parts of amine per part of Cis-Compound and vice versa. Two to one weight parts of amine per part of Cis-Compound and vice versa is preferred. One to one weight parts of amine to Cis-Compound are especially preferred.

While the phenomenon which gives rise to color formation in aqueous compositions containing Cis-Compound or Cis-, Trans-Compound is not completely understood, it is believed that Cis-Compound undergoes a slow hydrolysis to yield chloroallyl alcohol which is slowly oxidized to chloroallyl aldehyde. One of the reactions which the latter could undergo would be aldol condensation followed by dehydration to give colored species. Another reaction could be polymerization across the double bond. It is possible that both of these reactions could take place, giving a more complicated group of products. While it is not desired to be bound by these theoretical considerations, they do explain the color formation which occurs in aqueous formulations containing Cis-Compound and are consistent with observed results.

DESCRIPTION OF THE PREFERRED EMBODIMENTS

In the preparation of aqueous industrial compositions such as adhesives based on starches, animal glues, natural and synthetic gums, polyvinyl acetate and natural rubber, or emulsifiable metal-cutting fluids, cellulose-thickened latex paints, coatings, sizings and printing colors for pulp and paper manufacturers, or rayon-spinning emulsions, finishing solutions and printing pastes used by textile producers and the like, a substantially equal weight part of one of the amines and of Cis-Compound or Cis-Trans-Compound is used in the formulation, the formulation generally containing from about 0.05 to about 0.5 weight percent of amine, and of Cis- or Cis-, Trans-Compound based on total composition. Advantageously, the amine is added to the aqueous solution or formulation as soon as it is made, and, for best results, as soon as possible after the antimicrobials, Cis- or Cis-, Trans-Compound, are added to a water-containing formulation. In all other respects, the preparation of the above-mentioned compositions need not be changed. If desired, the aqueous phase may be buffered to an appropriate pH, e.g., between 6 and 8. However, buffering is not essential to the practice of this invention.

The following additional description and examples further describe the invention and the manner and process of making and using it to enable the art-skilled to make and use the same, and set forth the best mode contemplated by the inventors of carrying out the invention.

EXAMPLE 1 (a)

Two sets of aqueous solutions were prepared. One contained 1% Dowicil 200 and 1% of the amine to be tested. The other set contained 1% Dowicil 200 and was used as the control.

To expedite the experiment all solutions were subjected to accelerated aging at 50°C. This procedure is widely practiced in the cosmetic industry with the rule of thumb being that three weeks' aging at 50°C. corresponds to one year's aging at room temperature.

With the three secondary alkanolamines, diethanolamine, di-sec.-butanolamine and diisopropanolamine, after 72 hours at 50°C. the Dowicil 200 solutions had remained colorless, for all practical purposes, whereas the control solutions were intensely yellow. Further experiments showed that the 1% Dowicil 200 solutions turned intensely yellow overnight. The initial solutions containing the alkanolamines were kept in the 50°C. oven indefinitely to be examined periodically. Their color became a faint yellow after a few months and after four and one-half months they were still faint yellow and far better than the twenty four hour old solution of Dowicil 200.

EXAMPLE 1 (b)

Cis-Compound (1 percent by weight) and an amine (1 percent by weight), as specified below, were dissolved in a strongly buffered system (pH = 5.5, prepared by adding 50 ml. 1N NaOH to 500 ml. 1N $KH_2PO_4$), refluxing (~100°C.) for 10 minutes, cooling and visually comparing the intensities of the yellow color generated. Two controls were used for comparison, one percent Cis-Compound in the buffer solution and one percent Cis-Compound in deionized $H_2O$ alone (pH ~6). Even under the extremely accelerated nature of these tests, (high temperature and high concentration), the solutions with diethanolamine, morpholine, N-methylethanolamine or diisopropanolamine performed much better than the control, i.e., were only slightly yellow as compared to the intense yellow color observed for the control systems. On continued heating, the diethanolamine-inhibited Cis-Compound solution did become more intensely yellow, but the time required to equal the controls was 3–4 times greater. It was noted that the unbuffered control solution on repeated runs always became more intensely yellow than all the buffered solutions. A 0.1 molar buffer is more appropriate since 1 percent by weight Cis-Compound is approximately 0.04 molar and the amines were in the range of 0.01–0.04 M. As is apparent from the preceding example, buffering is not necessary to the practice of this invention.

EXAMPLE 2

The procedure of Example 1 (b) was repeated with diethanolamine (DEA) and the controls. The color intensity of the Cis-Compound solutions was measured spectrophotometrically during accelerated aging at 54°C. The results are shown in the following Table.

TABLE A

Absorbance (4000A) of Aqueous Cis-Compound 1% Solutions at 54°C.

| % DEA Added | Solution | 0 | 3 | 6 | 12 | 24 | 48 | 72 | 96 |
|---|---|---|---|---|---|---|---|---|---|
| 0.00 | I | 0.01 | 0.39 | 0.88 | 1.42 | 1.53 | 0.95 | 0.69 | 0.55 |
| 0.25 | II | 0.00 | 0.22 | 0.51 | 0.79 | 0.89 | 0.66 | — | — |
| 0.50 | III | 0.01 | 0.12 | 0.25 | 0.39 | 0.59 | 0.51 | 0.45 | 0.41 |
| 1.00 | IV | 0.00 | 0.10 | 0.15 | 0.25 | 0.39 | 0.38 | — | — |
| 2.00 | V | 0.00 | 0.05 | 0.09 | 0.17 | 0.29 | 0.29 | 0.31 | 0.30 |
| 0.00 | VI* | 0.03 | 0.18 | 0.40 | 0.89 | 1.60 | 2.40 | 2.60 | — |

*Unbuffered solution

There was an inverse correlation between the amount of DEA added and the maximum intensity of the yellow color.

Example 3

This example shows that the amine stabilizer does not have any substantial effect on the antimicrobial.

A 2,000 ml. portion of nutrient agar was prepared by hydrating 46 ml. of dry powder and heating it with approximately 2,000 ml. of water until all the agar had dissolved. Immediately after heating, about 100 ml. portions of the agar were placed in sixteen 250 ml. preweighed Erlenmeyer flasks and autoclaved. The flasks containing the agar were placed in a 42°C. constant temperature bath, slightly above the gel point of the agar. After thermal equilibrium was reached, the flasks were weighed and returned to the constant temperature bath while the amounts of aqueous 10 percent Cis-Compound and aqueous mixture of 10 percent Cis-Compound and 10 percent DEA stock solution needed to make up the following concentrations were added to the several flasks.

TABLE 1

| Cis-Compound + DEA, ppm each | Cis-Compound, ppm |
|---|---|
| 400 | 400 |
| 500 | 500 |
| 600 | 600 |
| 700 | 700 |
| 800 | 800 |
| 900 | 900 |

TABLE 1 — Continued

| Cis-Compound + DEA, ppm each | Cis-Compound, ppm |
|---|---|
| 1000 | 1000 |
| 0 | 0 |

The flasks were stirred and their contents divided into three sterile petri plates, giving a triplicate sample for each concentration.

When the agar had solidified, each plate was insulted with 0.1 ml. of a pool of two organisms, *Pseudomonas aeruginosa* and *Klebsiella pneumoniae*, the two species being present in equal concentrations and the total count being approximately $2 \times 10^8$ org./ml. After streaking, the plates were incubated for four days, then examined for growth.

The experiment was repeated, using the same stock solutions after aging them one, four and fourteen days. The procedure was the same with the exception that the concentration range was extended to include 100, 200 and 300 ppm of Cis-Compound and Cis-Compound + DEA.

The results of all four experiments are summarized in the following Table 2.

TABLE 2

| Time, days | Inhib'y. Concn., ppm each, Cis-Compound + DEA | Inhib'y. Concn., ppm Cis-Compound |
|---|---|---|
| 0 | 300 | 400 |
| 1 | 500 | 600 |
| 4 | 600 | 700 |
| 14 | 700 | 800 |

As shown in the Table, the activity of the mixture of aged or freshly prepared Cis-Compound + DEA was similar to that of Cis-Compound alone. With increased aging, the concentrations necessary for inhibition converge until there is an inversion around the eighth day. On the fourteenth day, when the last experiment was performed, it required 800 ppm Cis-Compound to inhibit growth when DEA was present. By this time, however, a substantial portion of the Cis-Compound had reacted with the OH present to form the corresponding carbinolamine, as was evident from the oil that had formed in the 10 percent Cis-Compound × DEA stock solution utilized. It appears that the hydroxyl ion concentration resulting from the presence of 10 percent DEA raised the pH high enough to cause the decomposition of Cis-Compound to the corresponding carbinoalmine. Even though the carbinolamine that was formed has been found to have antimicrobial activity comparable with Cis-Compound, its low solubility in water renders part of it useless in the agar, and explains why the activity of the Cis-Compound + DEA mixture drops more that that of Cis-Compound alone after 8 days. This will not be a problem in cosmetic formulations where the pH is conventionally maintained near neutral, or in dilute aqueous solutions where a small fraction of the amount of DEA is conventionally added. Equal amounts by weight of morpholine, ethylamine, N-methyethanolamine, dipropylamine, diisopropanolamine, and di-sec.-butanolamine give substantially similar results when substituted for DEA.

EXAMPLE 4

In this example, conventional cosmetic formulations were tested for color stability.

A. A proprietary lotion, Touch of Sweder, was prepared in the same manner as the commercial version, except that the yellow dye and the preservative system were omitted.

B. A prototype emulsion anionic hand lotion was also tested. It was prepared in a usual manner from the following oil and aqueous phases:

| | | |
|---|---|---|
| 20 g. Cetyl alcohol | | |
| 40 g. Lanolin | Oil phase | |
| 120 g. Stearic acid | | |
| 80 g. Glycerin | | |
| 30 g. Triethanolamine | Aqueous phase | |
| 3710 g. Water | | |
| 4000 g. Lotion | | |

Tests were run in parallel on lotions A and B, one set of samples being treated with Cis-Compound alone, and another set of samples being treated with an equal amount of a mixture of equal weight parts of Cis-Compound and DEA, in amounts from 100 to 1,000 ppm in increments of 100 ppm.

All test samples were insulted with 0.1 ml. of a pool of the following nine organisms: *Bacillus cereus, Bacillus subtilis, Escherichia coli, Klebsiella pneumioniae, Pseudonomas aeruginosa* PRD-10, *Pseudomonas aeruginosa, Proteus vulgaris, Salmonella cholerasius* and *Staphylococcus aureus*. The total count of this pool was approximately $10^9$ org./ml. After inoculation, the samples were incubated for 24 hours at 30°C., then were streaked in triplicate on sterile nutrient agar plates. These were in turn incubated for 48 hours, then examined for growth.

The results were as follows, + indicating growth and − indicating no growth:

| Lotion A | | Lotion B | |
|---|---|---|---|
| Cis-Cpd. + DEA ppm | Cis-Cpd. ppm | Cis-Cpd. + DEA ppm | Cis-Cpd. ppm |
| 100+ | 100+ | 100+ | 100+ |
| 200+ | 200+ | 200+ | 100+ |
| 300+ | 300+ | 300+ | 300+ |
| 400+ | 400+ | 400+ | 400+ |
| 500− | 500− | 500+ | 500+ |
| 600− | 600− | 600− | 600− |
| 700− | 700− | 700− | 700− |
| 800− | 800− | 800− | 800− |
| 900− | 900− | 900− | 900− |
| 1000− | 1000− | 1000− | 1000− |

The small difference in concentration of Cis-Compound necessary to kill the organisms in the two formulations is probably due to the fact that the organisms are effected slightly differently by the ingredients in the two formulations. The data show that Cis-Compound performed as an antimicrobial similarly in the individual formulations, whether DEA was present or not. This indicates that when DEA was added to a formulation to stabilize against the discoloration of Cis-Compound, it did not effect its antimicrobial activity.

EXAMPLE 5

Aqueous solutions of Cis-Compound or Cis-Trans-Compound, each solution containing from about 0.05 to about 0.5 weight percent of Cis-Compound or equivalent amount of Cis-Trans-Compound and an equal amount by weight of one of the amines morpholine, ethylamine, N-methylethanolamine, DEA, dipropylamine, diisopropanolamine or di-sec.-butanolamine is resistant to yellowing on aging to room temperature for 6 months. Continued aging at room temperature up to 2 years gives at most a slight yellow coloration, as compared with controls which exhibit strong yellow coloration after six months and intense yellow coloration at two years.

The range of color inhibiting proportions was found to be five parts to one part, by weight, of Cis-Compound to the amine and vice versa. A two to one weight ratio of Cis-Compound to amine and vice versa was preferred and a one to one weight ratio was especially preferred.

In those instances therein an aqueous formulation reacts with or vitiates the effect of one of the amines, as determined by an accelerated aging test at 50°C., it is relatively simple to reformulate, substituting a functional equivalent for the material which vitiates the effect of the amines.

What is claimed is:

1. An aqueous solution consisting essentially of about 0.05 to about 0.5 weight percent, solution basis, of cis-1-(3-chloroallyl)-3,5,7-triaza-1-azoniaadamantane chloride and, as a color-stabilizing agent for the said chloride to prevent yellowing, a substantially equal weight of an amine of the group morpholine, ethylamine, N-methylethanolamine, diethanolamine, dipropylamine, di-isopropanolamine and di-sec.-butanolamine.

2. A method for preventing yellowing of an aqueous solution consisting essentially of about 0.05 to about 0.5 weight percent of an antimicrobial preservative, cis-1-(3-chloroallyl)-3,5,7-triaza-1-azoniaadamantane chloride, by adding thereto a substantially equal weight of an amine of the group morpholine, ethylamine, N-methylethanolamine, diethanolamine, dipropylamine, diisopropanolamine and di-sec.-butanolamine.

* * * * *